(12) United States Patent
Hotta et al.

(10) Patent No.: US 9,640,804 B2
(45) Date of Patent: May 2, 2017

(54) FUEL CELL, AND FUEL CELL STACK

(71) Applicant: NGK SPARK PLUG CO., LTD., Nagoya-shi, Aichi (JP)

(72) Inventors: Nobuyuki Hotta, Konan (JP); Ryoji Tanimura, Nagoya (JP); Atsushi Mizuno, Komaki (JP); Tetsuya Morikawa, Ichinomiya (JP)

(73) Assignee: NGK SPARK PLUG CO., LTD., Aichi (JP)

( * ) Notice: Subject to any disclaimer, the term of this patent is extended or adjusted under 35 U.S.C. 154(b) by 199 days.

(21) Appl. No.: 14/417,519

(22) PCT Filed: Jul. 25, 2013

(86) PCT No.: PCT/JP2013/004529
§ 371 (c)(1),
(2) Date: Jan. 26, 2015

(87) PCT Pub. No.: WO2014/017096
PCT Pub. Date: Jan. 30, 2014

(65) Prior Publication Data
US 2015/0214557 A1    Jul. 30, 2015

(30) Foreign Application Priority Data

Jul. 27, 2012   (JP) .................................. 2012-166611

(51) Int. Cl.
*H01M 8/0247*    (2016.01)
*H01M 8/02*    (2016.01)
(Continued)

(52) U.S. Cl.
CPC ......... *H01M 8/0206* (2013.01); *H01M 2/202* (2013.01); *H01M 8/0232* (2013.01);
(Continued)

(58) Field of Classification Search
None
See application file for complete search history.

(56) References Cited

U.S. PATENT DOCUMENTS

2007/0231593 A1* 10/2007 Ryu .................... H01M 8/0247
428/596
2008/0124619 A1   5/2008 Tokutake et al.

FOREIGN PATENT DOCUMENTS

JP        2007-35498 A     2/2007
JP        2007-265896 A   10/2007
(Continued)

OTHER PUBLICATIONS

Search Report dated Oct. 29, 2013 issued by the International Searching Authority in counterpart International Patent Application No. PCT/JP2013/004529 (PCT/ISA/210).
(Continued)

*Primary Examiner* — Yoshitoshi Takeuchi
(74) *Attorney, Agent, or Firm* — Sughrue Mion, PLLC

(57) ABSTRACT

A fuel cell (3) includes interconnectors (hereinafter, IC) (12, 13), a cell body (20) disposed between the ICs and including an air electrode (14) and a fuel electrode (15) on both surfaces of an electrolyte (2), and current collecting members (18, 19) disposed between at least one of the electrodes (14, 15) and the ICs. The current collecting members (19) include connector contact portions (19a) in contact with the IC (13), cell body contact portions (19b) in contact with the cell body (20), and connecting portions (19c) that are bent approximately 180 degrees and connect both the contact portions. The connector contact portions include asperities (19e) on outside surfaces of the connector contact portions on the side where the connector contact portions are in contact with the IC 13, and a spacer (58) is disposed between the connector contact portions and the cell body contact portions.

11 Claims, 12 Drawing Sheets

(51) Int. Cl.
*H01M 8/04* (2016.01)
*H01M 2/14* (2006.01)
*H01M 8/0206* (2016.01)
*H01M 8/2425* (2016.01)
*H01M 8/0232* (2016.01)
*H01M 8/0245* (2016.01)
*H01M 2/20* (2006.01)
*H01M 8/248* (2016.01)
*H01M 8/124* (2016.01)

(52) U.S. Cl.
CPC ......... *H01M 8/0245* (2013.01); *H01M 8/248* (2013.01); *H01M 8/2425* (2013.01); *H01M 2008/1293* (2013.01)

(56) References Cited

FOREIGN PATENT DOCUMENTS

| | | |
|---|---|---|
| JP | 2008-140549 A | 6/2008 |
| JP | 2009-245897 A | 10/2009 |
| JP | 2009-266533 A | 11/2009 |
| JP | 2010-272499 A | 12/2010 |

OTHER PUBLICATIONS

Written Opinion dated Oct. 29, 2013 issued by the International Searching Authority in counterpart International Patent Application No. PCT/JP2013/004529 (PCT/ISA/237).

\* cited by examiner

FIG. 10
(a)
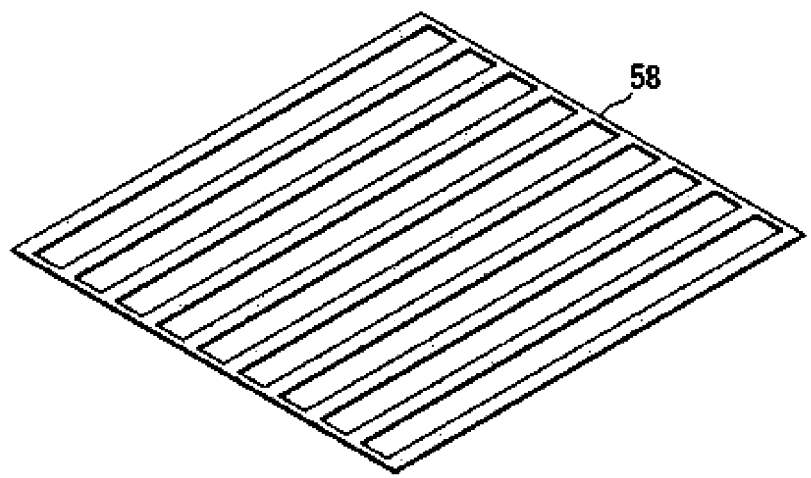
(b)
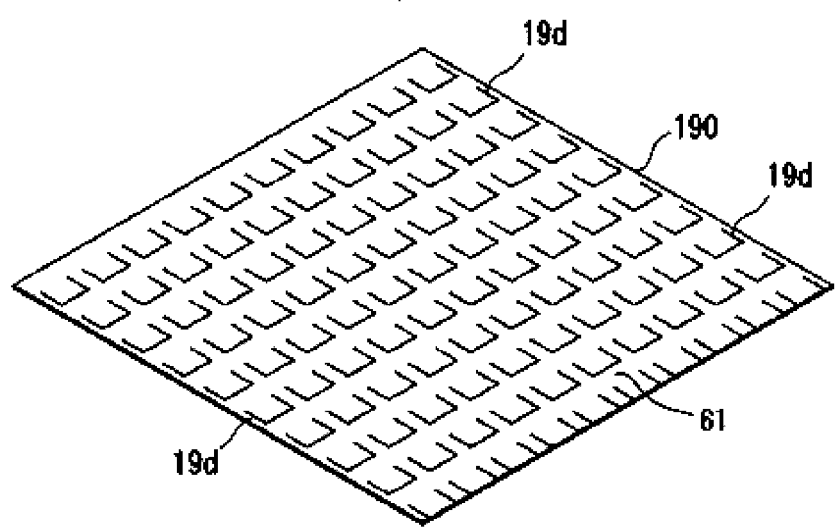
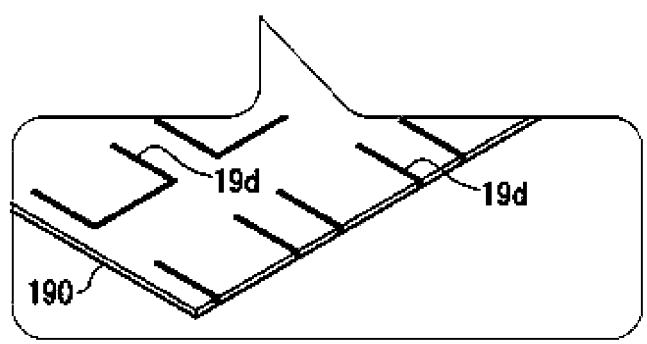

FUEL CELL, AND FUEL CELL STACK

CROSS REFERENCE TO RELATED APPLICATIONS

This application is a National Stage of International Application No. PCT/JP2013/004529 filed Jul. 25, 2013, claiming priority based on Japanese Patent Application No. 2012-166611 filed Jul. 27, 2012, the contents of all of which are incorporated herein by reference in their entirety.

TECHNICAL FIELD

The present invention relates to a fuel cell including two electrodes on both surfaces of an electrolyte layer, and configured to generate electric power by supplying a fuel gas to one of the electrodes (hereinafter, referred to as a fuel electrode) while supplying an oxidant gas to the other electrode (hereinafter, referred to as an air electrode), and a fuel cell stack including a plurality of the fuel cells stacked and fixed.

BACKGROUND ART

Conventionally, as described in Patent Literature 1 for example, there is a fuel cell including a pair of interconnectors, a cell body disposed between the interconnectors and including an air electrode on one surface of an electrolyte and a fuel electrode on the other surface, and a current collecting member disposed between the air electrode and the interconnector or between the fuel electrode and the interconnector and arranged to electrically connect the air electrode and the interconnector or the fuel electrode and the interconnector.

The current collecting member of this fuel cell has a structure that claw-shaped elastic members are cut to be raised from a current collecting plate having a flat plate shape, and is arranged to perform electrical connection by joining a flat surface of the current collecting plate to the interconnector via, for example, a conductive paste and bringing the tips of the cut and raised elastic members into contact with the cell body by the elasticity of the elastic members themselves.

CITATION LIST

Patent Literature
Patent Literature 1: JP-A-2009-266533

SUMMARY OF THE INVENTION

Problems to be Solved by the Invention

The current collecting member that brings the elastic members having conductivity into contact with the cell body by the elasticity of the elastic members as in the conventional technique cannot sometimes obtain a contact force for obtaining predetermined electrical connection since the current collecting member is plastically deformed in long-term use, and the elastic member having conductivity deteriorates its strength due to high heat during power generation, and further the elastic member having conductivity comes under the influence of creep deformation. In such a case, the elastic members having conductivity can no longer follow the deformation of the cell body due to fluctuations of the temperature cycle and/or the fuel pressure/air pressure, which causes uncertain contact and results in uncertain electric connection between the air electrode and the interconnector, or between the fuel electrode and the interconnector.

In addition, when the above-described factors, reducing the contact force to be required for obtaining electrical connection of the elastic members, comes to be complex ones, the portions of the elastic members that are to be in contact with the cell body may be brought into contact with the interconnector side in reverse. Meanwhile, the current collecting member is often made from a material having excellent joining characteristics to the interconnector (the conductive paste) since its flat surface is joined to the interconnector. Hence, being brought into contact with the interconnector (the conductive paste) side under the high temperature environment during power generation, the elastic members could be joined to the interconnector by sintering. In such a case, it is difficult for the elastic members to be brought into contact with the cell body since the elastic members are integrated with the interconnector, which could cause uncertain electric connection between the air electrode and the interconnector, or between the fuel electrode and the interconnector.

Meanwhile, there is another problem in that, for example, the conductive paste must be intervened between the flat surface of the current collecting plate and the interconnector in order to join both the members as described above, which causes an increase in cost.

The present invention is made in view of the above problems, and an object of the present invention is to provide a fuel cell and a fuel cell stack that are capable of maintaining favorable electrical connection even in long-term use.

Means for Solving the Problem

In order to achieve the above object, as described in claim 1, the present invention provides a fuel cell comprising:
a pair of interconnectors;
a cell body, which is disposed between the interconnectors, and which includes an air electrode on one surface of an electrolyte and a fuel electrode on the other surface; and
a current collecting member, which is disposed between at least one of the air electrode and the fuel electrode, and the interconnectors, and which is arranged to electrically connect the air electrode and/or the fuel electrode with the interconnectors,
wherein the current collecting member comprises a connector contact portion that is in contact with the interconnector, a cell body contact portion that is in contact with the cell body, and a connecting portion that is bent approximately 180 degrees and connects the connector contact portion and the cell body contact portion, the connector contact portion, the cell body contact portion and the connecting portion being formed in line, and the connector contact portion comprising asperities having surface roughness of which ten-point average roughness is Rz≥4 µm on an outside surface that is a surface of the connector contact portion on the side where the connector contact portion is in contact with the interconnector, and
wherein the fuel cell comprises a spacer disposed between the connector contact portion and the cell body contact portion that are opposed to each other between the cell body and the interconnector.

Further, as described in claim 2, the present invention provides the fuel cell according to claim 1, wherein the current collecting member is made of metallic foil made in an electroplating method.

Further, as described in claim 3, the present invention provides the fuel cell according to claim 1 or 2, wherein the current collecting member has a thickness of 15 to 100 μm.

Further, as described in claim 4, the present invention provides the fuel cell according to claim 1 or 3, wherein the outside surface of the current collecting member is made of metallic foil subjected to any one of sandblasting and etching.

Further, as described in claim 5, the present invention provides the fuel cell according to any one of claims 1 to 4, wherein the connector contact portion of the current collecting member is diffused to be joined to the interconnectors.

Further, as described in claim 6, the present invention provides a fuel cell stack comprising a plurality of the fuel cells according to any one of claims 1 to 5, wherein the fuel cells being stacked, and fixed by a clamping member.

Further, as described in claim 7, the present invention provides a method for producing a fuel cell, wherein the fuel cell comprises: a pair of interconnectors; a cell body including an air electrode on one surface of an electrolyte and a fuel electrode on the other surface; and a current collecting member made of a metallic flat plate having a front surface and a back surface, the method comprising the steps of: disposing the cell body between the pair of interconnectors; preparing the current collecting member made of the metallic flat plate having the back surface that has surface roughness of which ten-point average roughness is larger than the front surface; and disposing the current collecting member between the interconnectors and at least one of the air electrode and the fuel electrode of the cell body, wherein in the step of disposing the current collecting member, the back surface of the current collecting member is disposed so as to be electrically connected with the interconnectors and the electrodes of the cell body opposed to the interconnectors.

Further, as described in claim 8, the present invention provides the method for producing a fuel cell according to claim 7, the method comprising the steps of: making a cutoff line to form a segment in the metallic flat plate, and bending to raise the segment from the metallic flat plate; and disposing a spacer on the metallic flat plate, and sandwiching the spacer between the segment and the metallic flat plate to form the current collecting member.

Further, as described in claim 9, the present invention provides the method for producing a fuel cell according to claim 7, the method comprising a step of: making a cutoff line to form a segment in the metallic flat plate, and bending a portion of the segment into a U-shape so that the segment covers the metallic flat plate to form the current collecting member.

Further, as described in claim 10, the present invention provides the method for producing a fuel cell according to claim 9, the method comprising a step of: disposing a spacer between the segment and the metallic flat plate after the step of forming the current collecting member.

Further, as described in claim 11, the present invention provides the method for producing a fuel cell according to any one of claims 7 to 10, wherein the back surface of the metallic flat plate has surface roughness of which ten-point average roughness Rz is Rz≥4 μm.

Advantageous Effects of Invention

According to the fuel cell of the present invention, the spacer suppresses the connector contact portion and the cell body contact portion from being deformed easily in an opposite contact direction, so that the connector contact portion and the cell body contact portion are not plastically deformed easily. Further, the connector contact portion and the cell body contact portion are more likely to be tolerated to the strength reduction which is caused by high heat generated during the power generation, or creep deformation. In addition, since the spacer is disposed between the connector contact portion and the cell body contact portion of the current collecting member to prevent them from being brought into contact with each other, there is no possibility that the connector contact portion and the cell body contact portion join together by sintering. Therefore, integration of the connector contact portion and the cell body contact portion, and destabilization in electrical connection accompanied thereby can be prevented.

In addition, since the asperities are provided on the outside surface of the current collecting member, when the force, being required to bring the connector contact portion into the interconnector or to bring the cell body contact portion into the cell body, is generated by elasticity of the spacer and the like, such a force is converged to the convex portions of the asperities so as to increase the contact pressure from a micro point of view, which turns out reducing electrical resistance of a contact portion between the current collecting member and the interconnector or that of being required between the current collecting member and the cell body, lowering an electrical loss. Preferable asperities correspond ten-point average roughness Rz ≥4 μm of surface roughness. It is to be noted that the measuring method of Rz is in accordance with the JIS B0601:2001. (However, ten-point average roughness Rz of surface roughness described in the present application specifies "ten-point average roughness of surface roughness", and ten-point average roughness of surface roughness may be sometimes expressed as Rz or Rzj is depending on the definitions determined by the JIS.) In addition, when the ten-point average roughness Rz of the surface roughness of the current collecting member is measured after assembling the fuel cell for the operation, a portion that is not in contact with the cell body or the interconnector, for example, a connecting portion 19c of the current collecting member is cut off, and the ten-point average roughness Rz of the surface roughness of the surface of the connecting portion 19c on the side corresponding to the portion that are in contact with the cell body and the interconnector can be measured in accordance with the JIS B0601:2001.

The metallic foil made in the electroplating method inherently includes fine asperities on one side, so that using such metallic foil as the current collecting member as described in claim 2 brings about cost saving.

It is also preferable that the thickness of the current collecting member may be in a range of 15 to 100 μm as described in claim 3. If the current collecting member is thinner than 15 μm, the current collecting member cannot easily obtain necessary strength, and has electrical resistance increased. In addition, if the current collecting member is thicker than 100 μm, a repelling force of bending the connecting portion 180 degrees becomes excess, which could cause the cell body to crack at the time of assembly.

The asperities of the current collecting member can be formed by sandblasting or etching as described in claim 4.

In addition, if the connector contact portion of the current collecting member is diffused to be joined to the interconnectors as described in claim 5, joint strength of the diffusion join is increased by the asperities on the outside surface, which allows the current collecting member to obtain sufficient joint strength without deliberately using a conductive paste.

In addition, including the plurality of the fuel cells according to any one of claims 1 to 5 that are stacked and fixed by the clamping member, the fuel cell stack described in claim 6 can maintain favorable electrical connection even in long-term use.

In addition, according to the method for producing a fuel cell of the present invention, the surface of the current collecting member is made of the metallic flat plate, and the surface, having the larger ten-point average roughness, is brought into contact with the interconnectors and the cell body. This reduces electrical resistance of a contact portion between the current collecting member and the interconnectors, or between the current collecting member and the cell body so that electrical loss can be also lowered.

In addition, according to the method for producing a fuel cell according to claim 8, since the cutoff line is made to form the segment in the metallic flat plate, and after the segment was bent to be raised, the spacer is disposed on the metallic flat plate to sandwich the spacer between the segment and the metallic flat plate, positioning of the spacer can be made relative to the bent and raised segment, which facilitates mounting of the spacer on the current collecting member.

In addition, according to the method for producing a fuel cell according to claim 9, since the cutoff line is made to form the segment in the metallic flat plate and the segment is bent into a U-shape to form the current collecting member, the current collecting member presses the interconnectors and the cell body, which can secure joint strength between the current collecting member and the interconnectors or between the current collecting member and the cell body.

In addition, according to the method for producing a fuel cell according to claim 10, positioning of the spacer can be made relative to the segment that is bent into a U-shape, which facilitates mounting of the spacer on the current collecting member.

In addition, according to the method for producing a fuel cell according to claim 11, since the surface of the current collecting member, the surface being in contact with the interconnectors or the cell body, has the surface roughness of which the ten-point average roughness is Rz≥4 μm, joint strength between the current collecting member and the interconnectors or between the current collecting member and the cell body is improved. In addition, electrical resistance of a contact portion between the current collecting member and the interconnectors or between the current collecting member and the cell body is reduced to reduce electrical loss.

BRIEF DESCRIPTION OF THE DRAWINGS

FIG. 10(a) is a perspective view of a spacer,
and FIG. 10(b) is a perspective view of the current collecting member on which the spacer is yet to be mounted.

MODES FOR CARRYING OUT THE INVENTION

Figure 1:
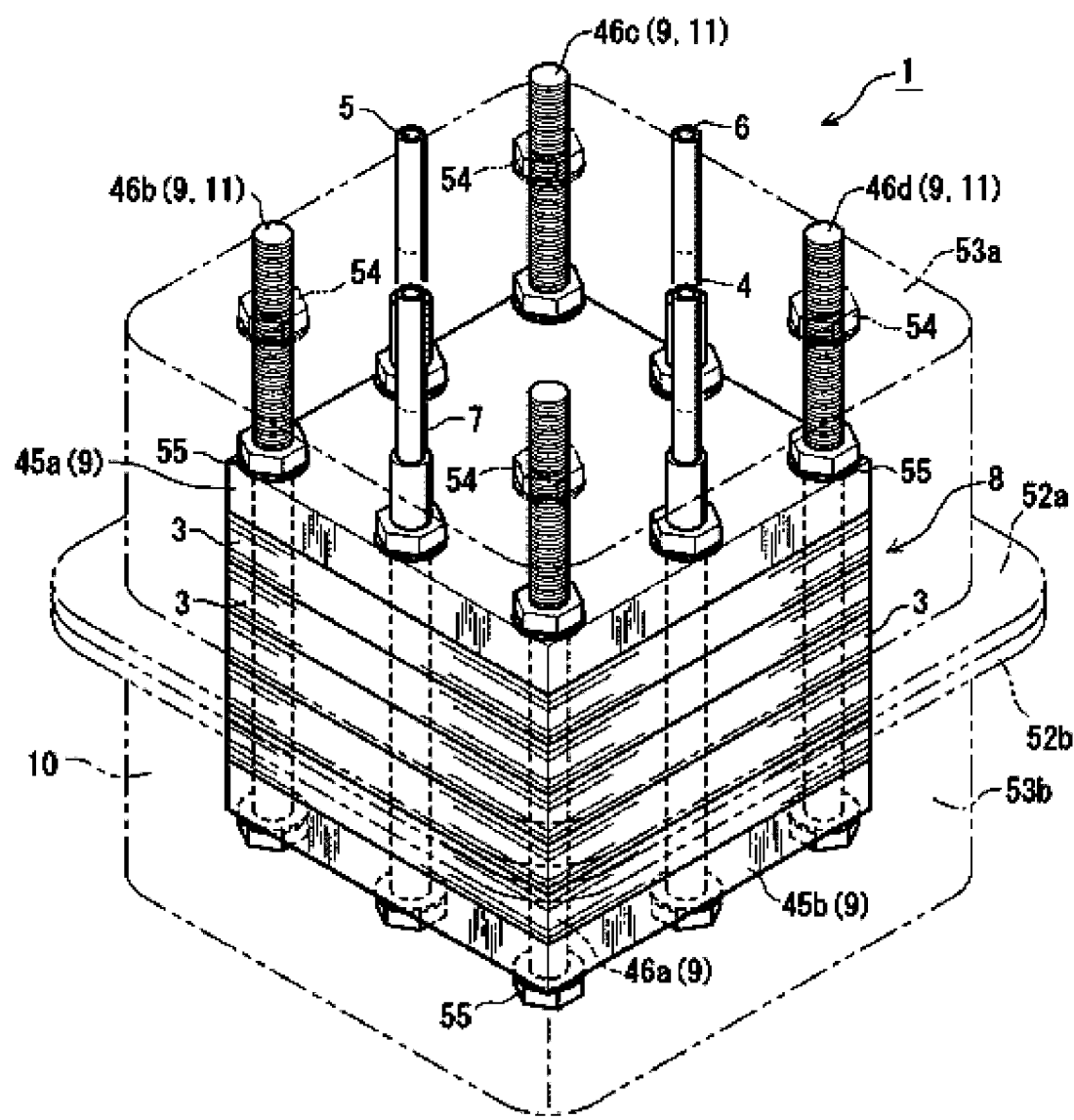
FIG. 1 is a perspective view of a fuel cell stack structure.
Figure 2:
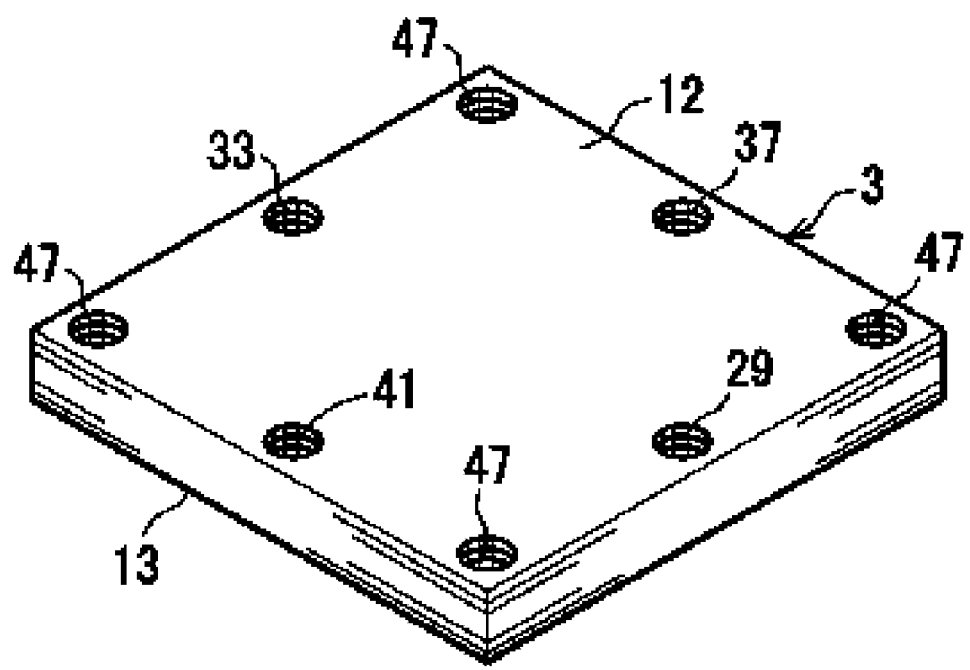
FIG. 2 is a perspective view of a fuel cell.

At present, a fuel cell falls roughly into four types depending on the material of the electrolyte: a polymer electrolyte fuel cell (PEFC) in which a polyelectrolyte film is used as an electrolyte, a phosphoric acid type fuel cell (PAFC) in which a phosphoric acid is used as an electrolyte, a molten carbonate fuel cell (MCFC) in which Li-Na/K carbonate is used as an electrolyte, and a solid oxide fuel cell (SOFC) in which, for example, ZrO2-based ceramic is used as an electrolyte. The fuel batteries of four types are different in operating temperature (the temperature at which ions can move in an electrolyte), and at present, the operating temperature of the PEFC is room temperature to about 90° C., the operating temperature of the PAFC is about 150° C. to 200° C., the operating temperature of the MCFC is about 650° C. to 700° C., and the operating temperature of the SOFC is about 700° C. to 1000° C.

A fuel cell stack structure 1 defines an SOFC, in which, for example, ZrO2-based ceramic is used as an electrolyte 2. The fuel cell stack structure 1 generally includes a fuel cell 3 that is a smallest power generation unit, an air supply passage 4 for supplying air to the fuel cell 3, an air discharge passage 5 for discharging the air to the outside, a fuel supply passage 6 for supplying a fuel gas to the fuel cell 3 in a similar manner, a fuel discharge passage 7 for discharging the fuel gas to the outside, fixing members 9 for fixing a cell group that is prepared by stacking a plurality of sets of the fuel cells 3 to form a fuel cell stack 8, a container 10 for housing the fuel cell stack 8, and output members 11 for outputting electricity generated in the fuel cell stack 8.

[Fuel Cell]

Figure 3:
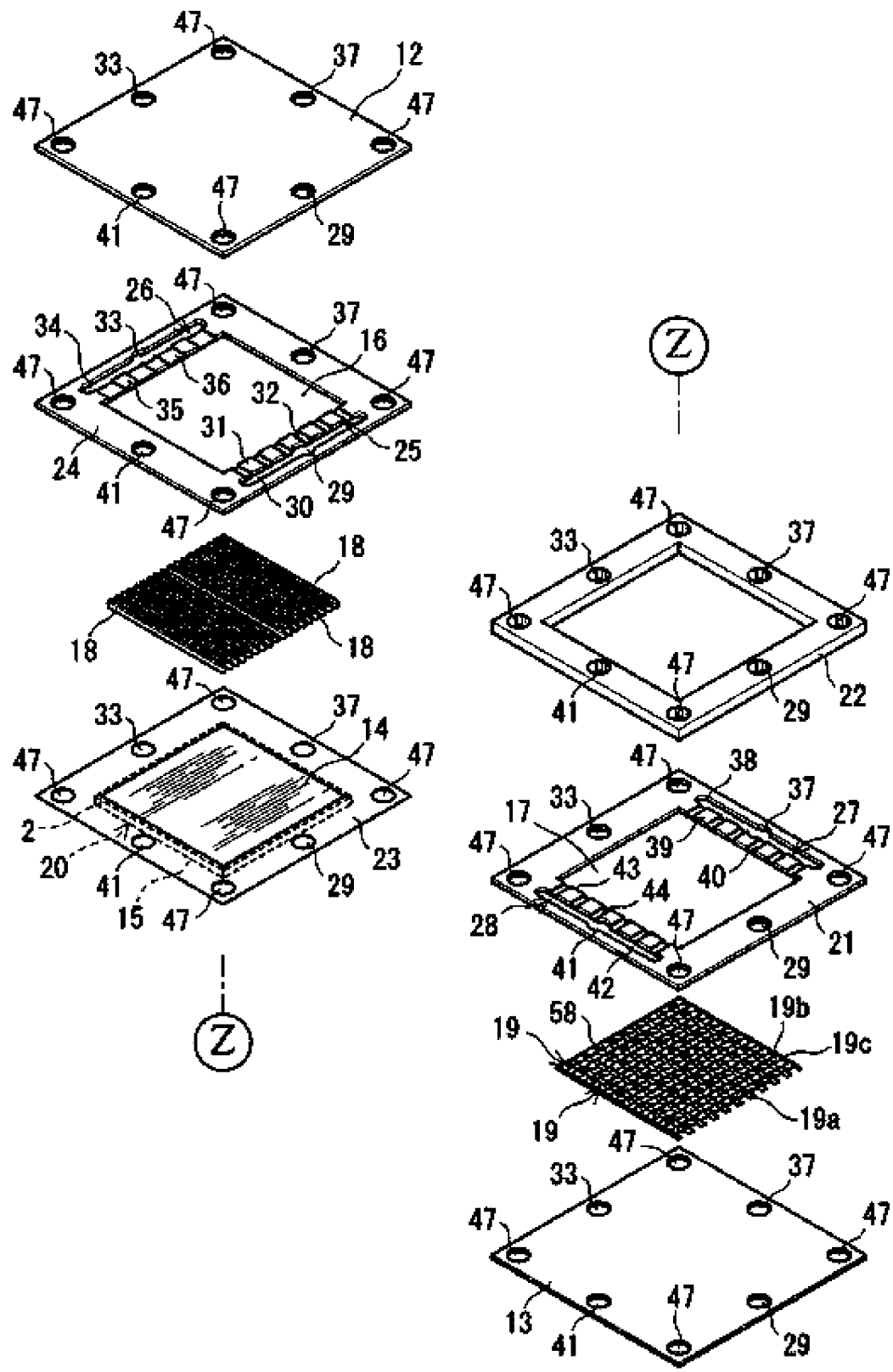
FIG. 3 is an exploded perspective view of the fuel cell.

The fuel cell 3 is square in a plan view, and includes as shown in FIG. 3 a top interconnector 12 (* "top" or "bottom" in the present description is based on the drawings, which are referred to for the sake of illustration, and do not mean the absolute vertical orientation. The same shall apply hereinafter.) that is made of ferritic stainless steel having conductivity (e.g., Crofer22H) or the like in a square plate shape, a bottom interconnector 13 that is made as well of ferritic stainless steel (e.g., Crofer22H) or the like in a square plate shape, a cell body 20 disposed nearly midway between the top and bottom interconnectors 12 and 13 and including an air electrode 14 disposed on a surface of the electrolyte 2 opposed to an inner surface (lower surface) of the top interconnector 12, a fuel electrode 15 disposed on a surface of the electrolyte 2 opposed to an inner surface (upper surface) of the bottom interconnector 13, an air chamber 16 formed between the top interconnector 12 and the air electrode 14, a fuel chamber 17 formed between the bottom interconnector 13 and the fuel electrode 15, current collecting members 18 on the side of the air electrode 14, the current collecting members 18 being disposed inside the air chamber 16 and arranged to electrically connect the air electrode 14 and the top interconnector 12, and current collecting members 19 on the side of the fuel electrode 15, the current collecting members 19 being disposed inside the fuel chamber 17 and arranged to electrically connect the fuel electrode 15 and the bottom interconnector 13, and in the corners of the square, corner through-holes 47, 47 . . . , through which clamping members 46a to 46d to be described later of the above-described fixing members 9 pass, are formed so as to penetrate.

[Electrolyte]

The electrolyte 2 is made from LaGaO3-based ceramic, BaCeO3-based ceramic, SrCeO3-based ceramic, SrZrO3-based ceramic, CaZrO3-based ceramic, or the like in addition to the ZrO2-based ceramic.

[Fuel Electrode]

Examples of a material of the above-described fuel electrode 15 include a mixture of a metal such as Ni and Fe, and at least one of ceramics such as ZrO2-based ceramic such as zirconia that is stabilized by at least one kind of rare earth elements such as Sc and Y, and CeO2-based ceramic. In addition, the material of the above-described fuel electrode 15 may be a metal such as Pt, Au, Ag, Pb, Ir, Ru, Rh, Ni, and Fe, and only one kind of these metals may be used, or two or more kinds of these metals may be used as an alloy. Further, the examples of the material include a mixture (including a cermet) of these metals and/or alloys, and at least one kind of the above-described ceramics. In addition, the examples of the material include a mixture or the like of an oxide of a metal such as Ni and Fe, and at least one kind of the above-described ceramics.

[Air Electrode]

Examples of a material of the above-described air electrode 14 include a variety of metals, oxides of metals, multiple oxides of metals, and the like.

Examples of the above-described metals include metals such as Pt, Au, Ag, Pb, Ir, Ru and Rh, or alloys containing two or more kinds of metals.

Further, examples of the oxides of metals include oxides of La, Sr, Ce, Co, Mn, Fe, and the like (La2O3, SrO, Ce2O3, Co2O3, MnO2, FeO, and the like).

In addition, examples of the multiple oxides include multiple oxides containing at least La, Pr, Sm, Sr, Ba, Co, Fe, Mn, and the like (La1-XSrXCoO3-based multiple oxide, La1-XSrX FeO3-based multiple oxide, La1-XSrXCo1-yFeO3-based multiple oxide, La1-XSrXMnO3-based multiple oxide, Pr1-XBaXCoO3-based multiple oxide, Sm1-XSrXCoO3-based multiple oxide, and the like).

[Fuel Chamber]

Figure 4:
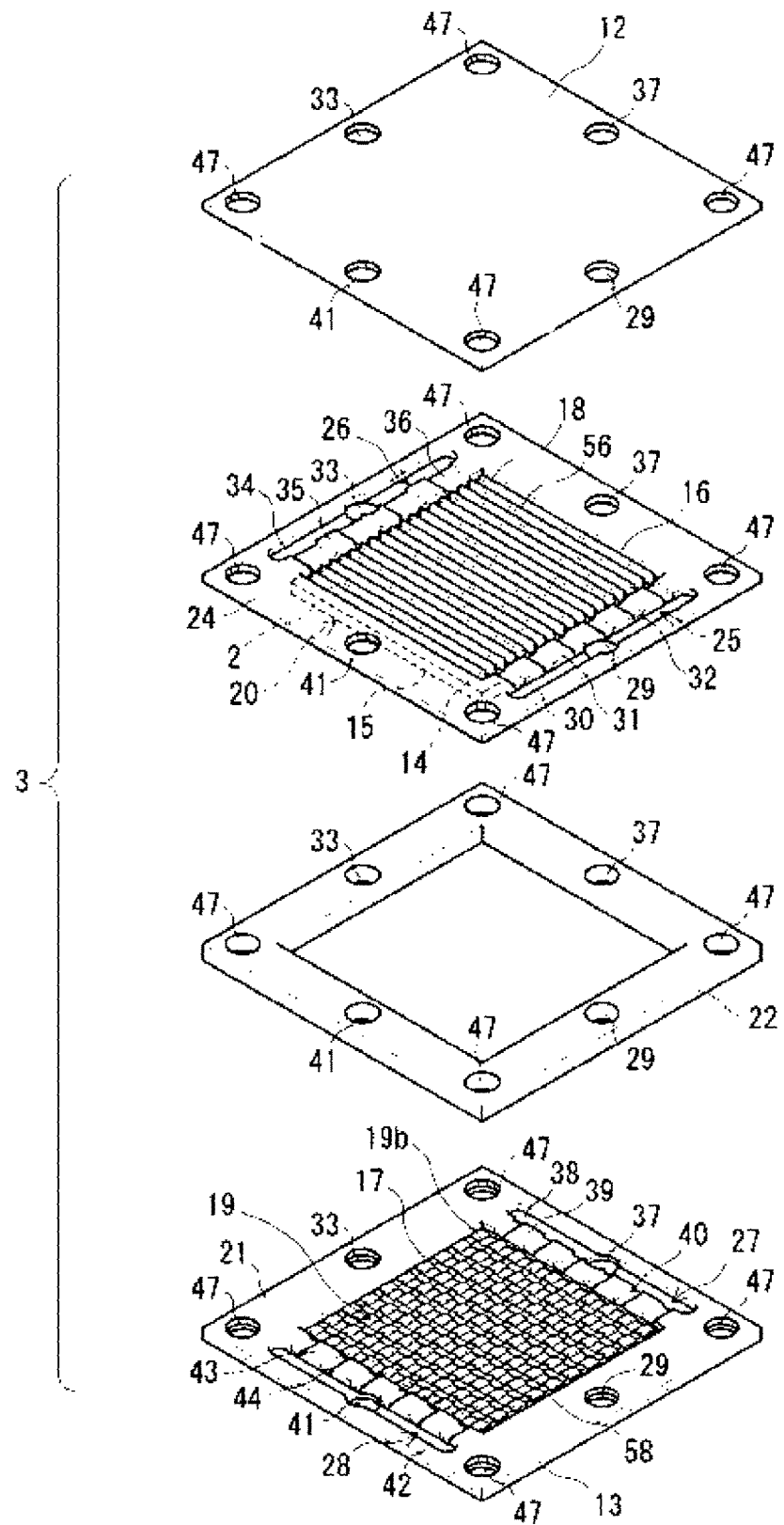
FIG. 4 is an exploded perspective view of the fuel cell showing only narrowed parts.

The above-described fuel chamber 17 is formed into a square chamber shape by an insulation frame 21 having a frame shape for forming a fuel electrode gas passage (hereinafter, also referred to as the "fuel electrode insulation frame 21") that is disposed on the upper surface of the bottom interconnector 13 so as to surround the current collecting members 19, and a fuel electrode frame 22 having a frame shape that is disposed on the upper surface of the fuel electrode insulation frame 21 as show in FIG. 3 to FIG. 5.

[Current Collecting Members on the Side of a Fuel Chamber]

The current collecting members 19 on the side of the fuel chamber 17 are made of, for example, Ni foil having a thickness of 15 to 100 μm, and include connector contact portions 19a that are in contact with the bottom interconnector 13, cell body contact portions 19b that are in contact with the fuel electrode 15 of the cell body 20, and connecting portions 19c having a U-shape that are bent 180 degrees and connect the connector contact portions 19a and the cell body contact portions 19b, the connector contact portions 19a, the cell body contact portions 19b, and the connecting portions 19c being formed in line.

Figure 12:
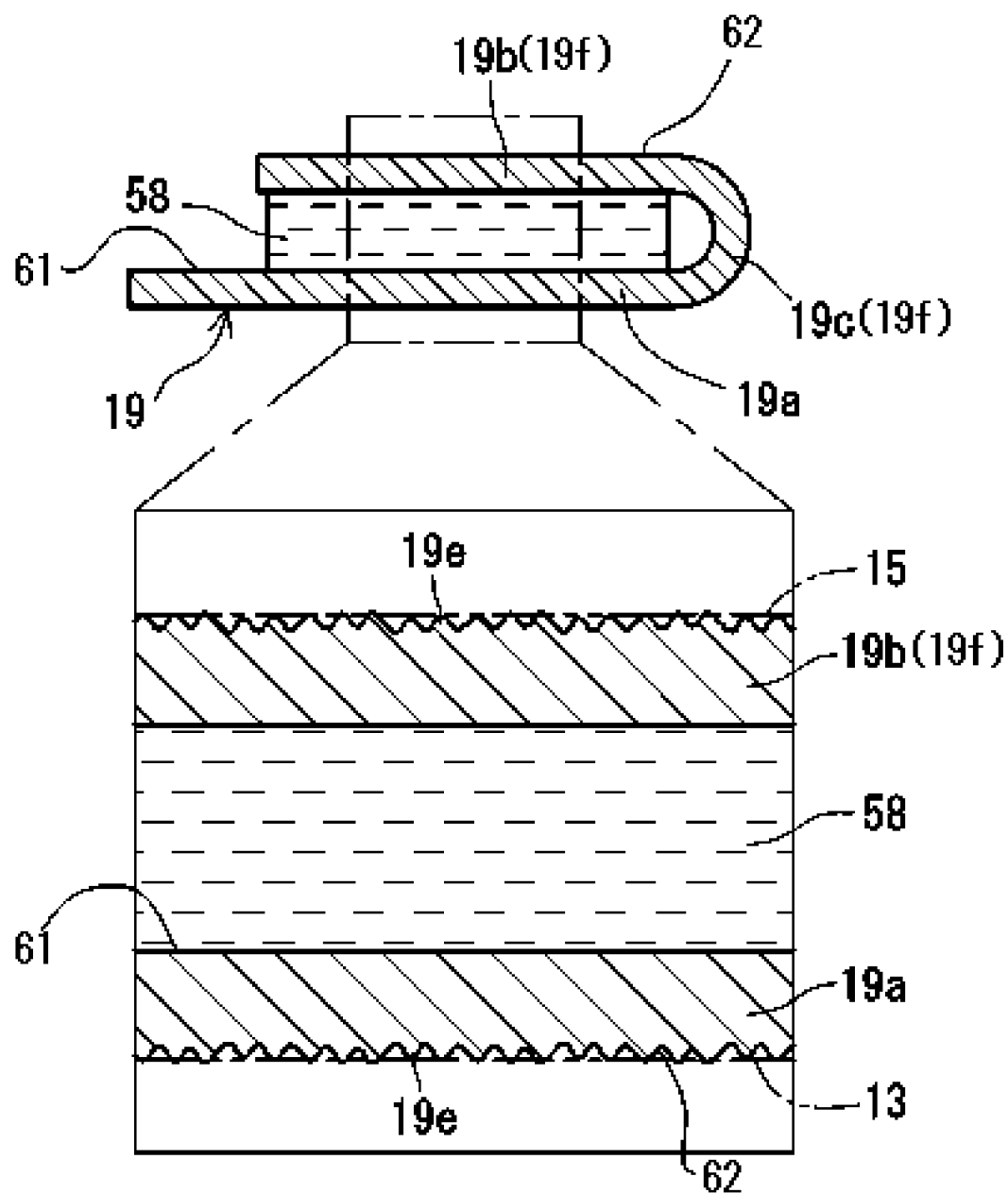
FIG. 12 is a cross-sectional view of the current collecting member in which an enlarged view of main parts is included.

The Ni foil is made in an already-known electroplating method, and as shown in the enlarged view of FIG. 12 includes fine asperities 19e that correspond to ten-point average roughness of Rz≥4 μm in surface roughness on the outside surface that is a surface of the connector contact portion 19a on the side where the connector contact portion 19a is in contact with the interconnector 13. It is to be noted that the state where the connecting portions 19c are in a U-shape being bent 180 degrees expresses the state where the cell body contact portions 19b are folded back so as to cover the connector contact portions 19a.

It is to be noted that the current collecting members 19 on the side of the fuel chamber 17 may be made not only of Ni foil but also of, for example, a porous metal, a wire net, or a wire made from Ni. In addition, the current collecting members 19 on the side of the fuel chamber 17 may be made not only from Ni but also from an Ni alloy, or a metal such as stainless steel that is high oxidation resistant.

The current collecting members 19 are produced in the following method.

About several tens to one hundred of the current collecting members 19 (needless to say, the number differs depending on the size of the fuel chamber) are provided to the fuel chamber 17, and while they may be individually disposed on to be joined to the interconnector 13 (details of the join will be described later), it is preferable that the above-described Ni foil is processed into a square flat plate (also referred to as a metallic flat plate) 190 that fits on the fuel chamber 17 as shown in FIG. 10(b) to make cutoff lines 19d that correspond to segments 19f consisting of the cell body contact portions 19b and the connecting portions 19c in the flat plate 190, and then as shown in the enlarged view of FIG. 9, the connecting portions 19c are bent into a U-shape such that a cell body contact portion 19b is folded back so as to cover a connector contact portion 19a while providing space t (see the enlarged view of FIG. 5) over the connector contact portion 19a. That is, the connecting portion 19c that is a portion of the segments 19f is bent into a U-shape such that the cell body contact portions 19b cover the connector contact portions 19a of the metallic flat plate 190. In this case, the perforated flat plate 190 that is a remainder after the cell body contact portions 19b are bent to be raised from the flat plate 190 is an assembly of the connector contact portions 19a, and in the present embodiment, the connector contact portions 19a of the flat plate 190 are joined to the bottom interconnector 13.

Figure 11:
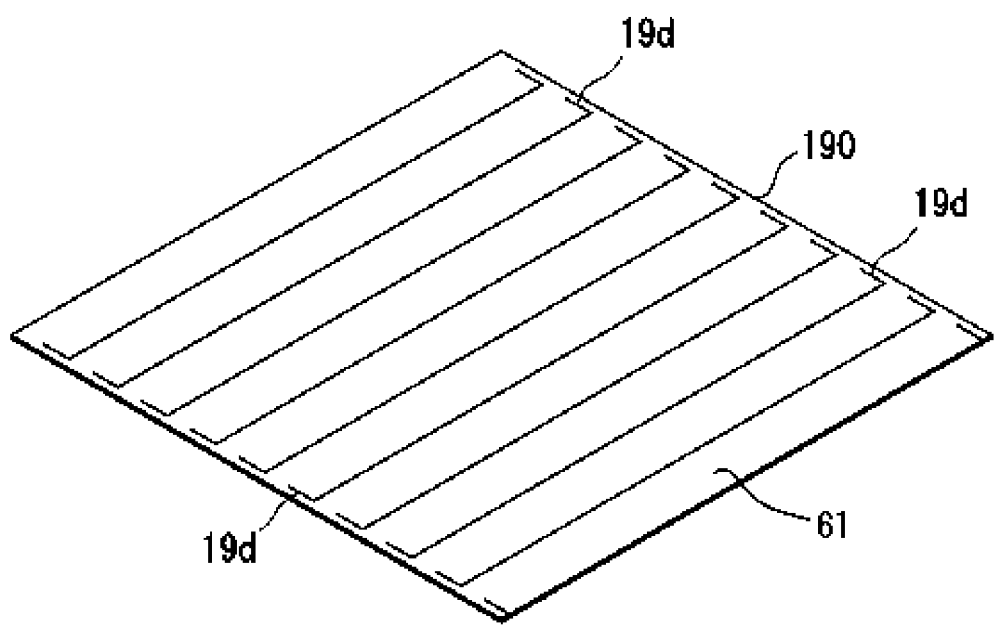
FIG. 11 is a perspective view of the current collecting member that is a modified embodiment of FIG. 10(b).

It is to be noted that the above-described cutoff lines 19d of the current collecting members 19 may be made in the form that the cell body contact portions 19b and the connecting portions 19c are integrated in lines as shown in FIG. 11. This form allows the cell body contact portions 19b and the connecting portions 19c to be processed efficiently.

[Spacer]

Figure 5:
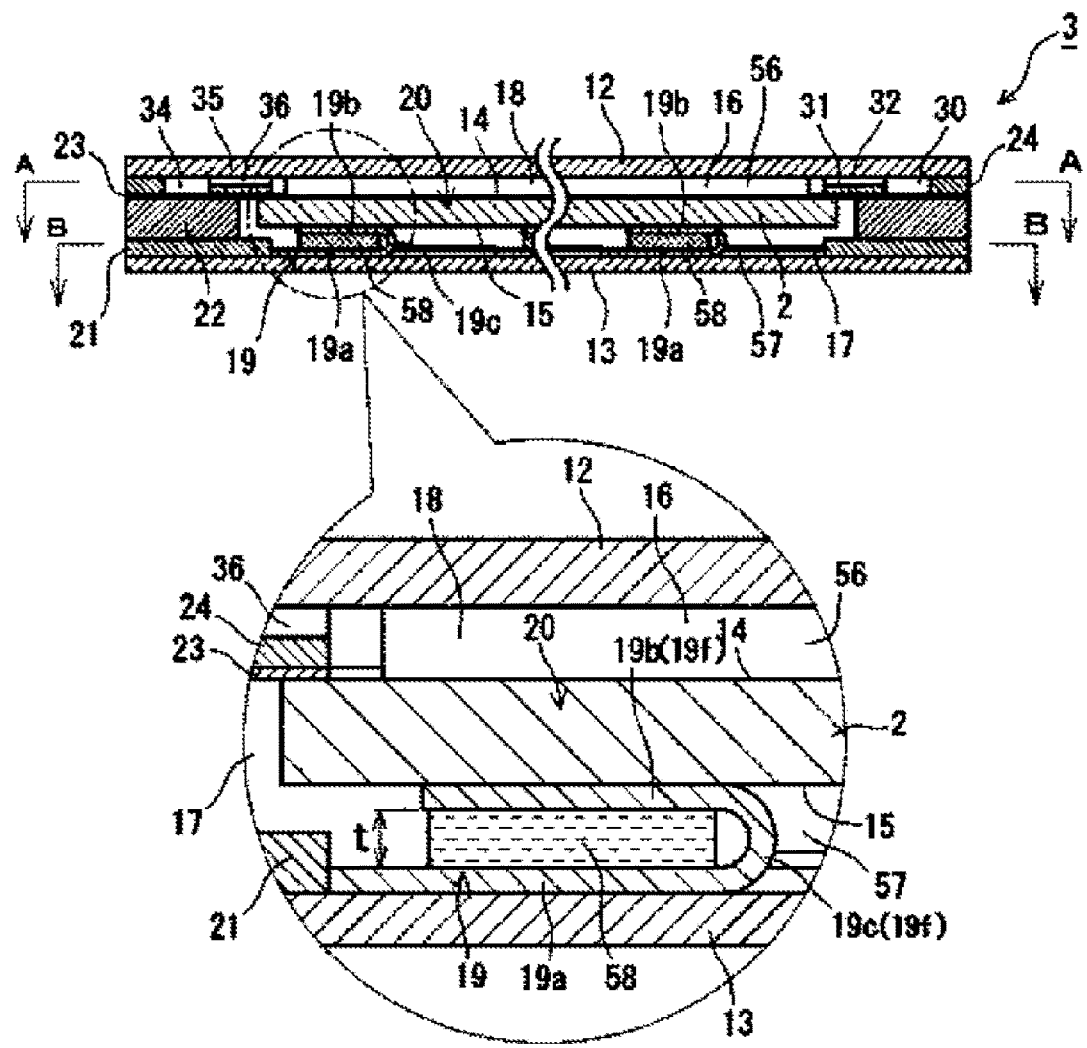
FIG. 5 is a longitudinal sectional view of the fuel cell where the middle portion is omitted.
Figure 6:
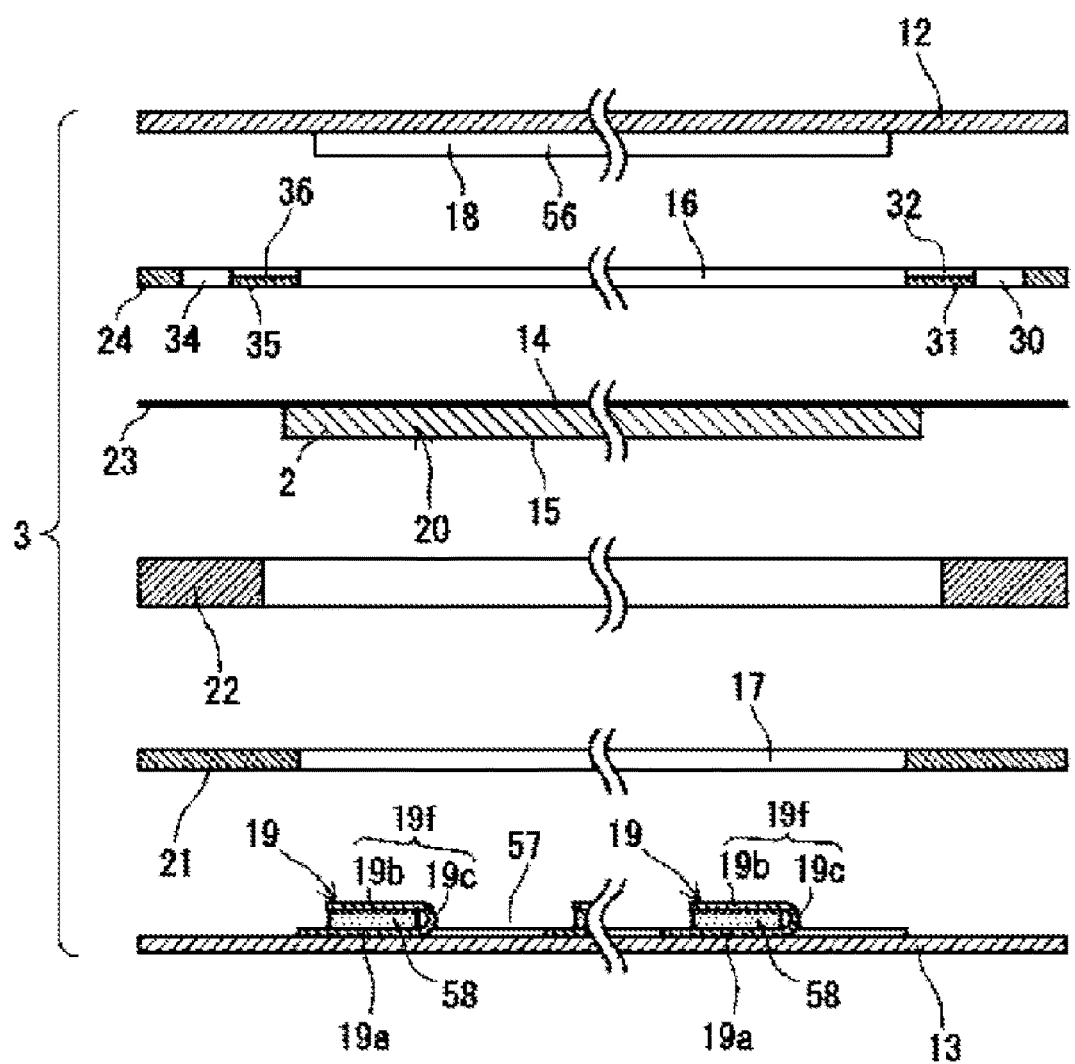
FIG. 6 is a longitudinal sectional view showing FIG. 5 that is disassembled.

A Spacer 58 is also provided to the above-described current collecting members 19 as shown in FIG. 5. In the fuel chamber 17 being located between the cell body 20 and the bottom interconnector 13, the spacer 58 is disposed between the connector contact portions 19a and the cell body contact portions 19b so as to separate the connector contact portions 19a from the cell body contact portions 19b. Further, the spacer 58 has elasticity in a thickness direction, and is made from a material such as becoming larger in thickness by thermal expansion at 700° C. to 1000° C., which falls in the fuel cell operating temperature region. More specifically, the material of the spacer 58 might be expanded in a thickness direction by thermal expansion in a way such that the thickness of the spacer 58 becomes larger than the above-described space t, which might be also expanded by the thermal expansion, in order to press the cell body contact portions 19*b* and the connector contact portions 19*a* to the respective contact directions, namely pressing the cell body contact portions 19*b* toward the cell body 20 while pressing the connector contact portions 19*a* toward the interconnector 13.

It is to be noted that the thickness of the spacer 58 needs only to be larger than the space t between the cell body contact portion 19*b* and the connector contact portion 19*a* in a state where the spacer 58 is in the fuel cell operating temperature region; however, it is preferable to set the thickness of the spacer 58 to be at least approximately as large as or slightly larger than the space t between the cell body contact portion 19*b* and the connector contact portion 19*a* in a state where the spacer 58 is at room temperature at which the fuel cell does not operate. Thus, even during the time from the start of power generation until the temperature reaches the fuel cell operating temperature region, electrical connection between the connector contact portions 19*a* and the interconnector 13 and between the cell body contact portions 19*b* and the cell body 20 can be stabilized by the spacer 58.

In addition, a material having elasticity larger than the current collecting members 19 in the thickness direction is selected for the spacer 58. The thickness of the spacer 58 greatly increases or decreases in accordance with the space of the fuel chamber 17 which changes due to temperature cycle or fuel pressure/air pressure, compared with the thickness of the current collecting members 19 that has relatively small elasticity. To be specific, the spacer 58 shrinks in the thickness direction in response to shrink of the above-described space of the fuel chamber 17 to exert a buffer function, which turns out preventing the cell body 20 from cracking, and on the other hand, recovering its original shape in the thickness direction in response to expansion of the above-described space to stabilize the electrical contact.

In addition, the spacer 58 is made from a material having properties not to sinter with the current collecting members 19 in the fuel cell operating temperature region, so that there is no chance that the cell body contact portions 19*b* and the connector contact portions 19*a* are brought into direct contact with each other to sinter, which is needless to say, and also the cell body contact portions 19*b* and the connector contact portions 19*a* are unlikely to sinter through the spacer 58.

Examples of the material of the spacer 58 that satisfies the above conditions may include any one kind or a combination of two or more kinds of mica, alumina felt, vermiculite, carbon fiber, silicon carbide fiber, and silica.

In addition, it is preferable that these materials have a lamination structure of a thin plate-like body such as mica since appropriate elasticity is provided against a load in a lamination direction.

These materials have a coefficient of thermal expansion higher than the clamping members 46*a* to 46*d* to be described later.

It is to be noted that the current collecting members 19 according to the present embodiment are of a monolithic construction such that the current collecting members 19 are connected to each other by the flat plate 190 that is an assembly of the connector contact portions 19*a*, and in accordance with this construction, the spacer 58 is made of one material sheet having a square shape approximately same in width as and slightly shorter than the flat plate 190 (to be specific, shorter by a length corresponding to one (the cell body contact portion 19*b*+the connecting portion 19*c*)), and formed into a transverse lattice pattern by cutting out the portions as a whole by the line that correspond to the cell body contact portions 19*b* and the connecting portions 19*c* as shown in FIG. 10(*a*).

Figure 9:
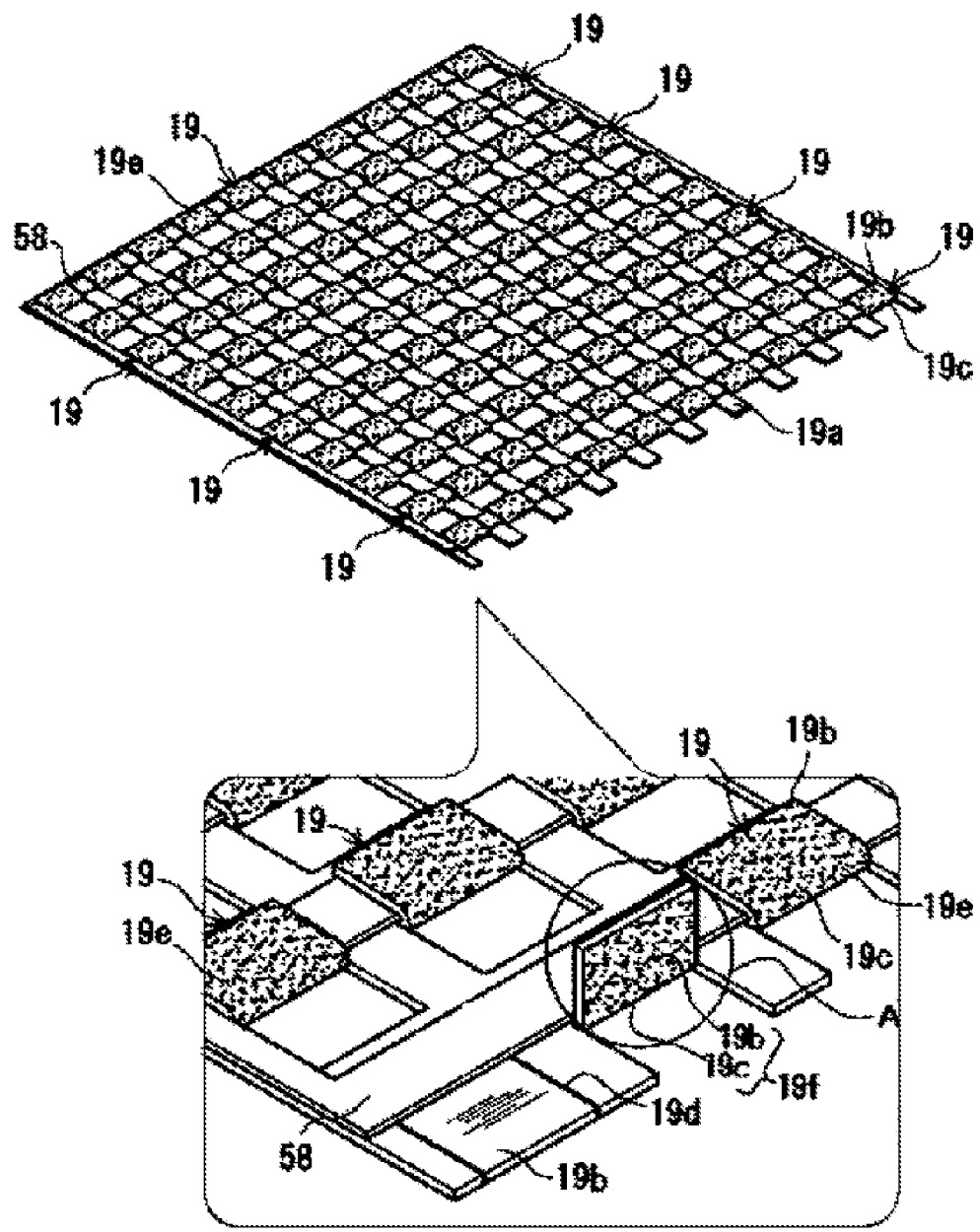
FIG. 9 is a perspective view of a current collecting member.

Then, this spacer 58 is overlaid on the flat plate 190 shown in FIG. 10(*b*) where the current collecting members 19 are yet to be made, and the connecting portions 19*c* are bent into a U-shape in that state as shown in the enlarged view of FIG. 9, which can produce the current collecting members 19 on which the spacer 58 is mounted in advance.

That is, the connecting portions 19*c* that are portions of the segments 19*f* are bent into a U-shape such that the cell body contact portions 19*b* cover the connector contact portions 19*a* of the metallic flat plate 190 via the spacer 58.

Incidentally, while shown in the enlarged view of FIG. 9 is the cell body contact portions 19*b* that are bent in stages from the one that is disposed at the left corner to the right, this drawing is made mainly in order to explain the working procedure, so that the bending work of the cell body contact portions 19*b* may be performed all together, or may be performed in sequence starting from the portions convenient for the bending work.

In addition, in another production method, the above-described Ni foil is processed into the square metallic flat plate 190 that fits on the fuel chamber 17 as shown in FIG. 10(*b*) to make the plurality of cutoff lines 19*d* that correspond to the segments 19*f* in the flat plate 190. Then, the plurality of segments 19*f* are bent to be raised in the vertical direction with respect to the metallic flat plate 190 such that the segments 19*f* may function as positioning for sandwiching the spacer 58 as shown in the enlarged portion A of FIG. 9. The segments 19*f* need only to be raised to a degree that positioning of the spacer 58 can be performed, and are preferably raised in the approximately vertical state with respect to the flat plate 190. Then, the spacer 58 is disposed over the entire metallic flat plate 190 where the segments 19*f* are raised. After disposing the spacer 58, the connecting portions 19*c* are subjected to bending work so as to sandwich the spacer 58 between the connector contact portions 19*a* and the cell body contact portions 19*b* of the segments 19*f* to produce the current collecting members 19 on which the spacer 58 is mounted in advance. In this case, the perforated metallic flat plate 190 that is a remainder after the segments 19*f* are bent to be raised from the metallic flat plate 190 is an assembly of the connector contact portions 19*a*.

In addition, the bending work of the connecting portions 19*c* may be performed all together, or may be performed in sequence starting from the portions convenient for the bending work.

Further, in another production method, the connecting portions 19*c* are bent into a U-shape such that the cell body contact portions 19*b* are folded back to cover the connector contact portions 19*a* while providing the spaces t (see the enlarged view of FIG. 5) above the connector contact portions 19*a* as shown in the enlarged portion A of FIG. 9 to produce the current collecting members 19. The spacer 58 is disposed between the cell body contact portions 19*b* of these current collecting members 19 and the connector contact portions 19*a* to produce the current collecting members 19 on which the spacer 58 is mounted.

[Air Chamber]

The above-described air chamber 16 has a square frame shape, and is formed into a square chamber shape by a conductive thin metallic separator 23 on the bottom surface of which the above-described electrolyte 2 is attached and an insulation frame 24 having a frame shape for forming an air electrode gas passage (hereinafter, also referred to as the "air electrode insulation frame 24") that is disposed between the separator 23 and the top interconnector 12 so as to surround the current collecting members 18 as show in FIG. 3 to FIG. 5.

[Current Collecting Members on the Side of the Air Chamber]

The current collecting members 18 on the side of the air chamber 16 are made of, for example, stainless steel members that have the shape of a long thin square log and are dense conductive members, and the plurality of current collecting members 18 are disposed in parallel at regular intervals while being in contact with the air electrode 14 on the upper surface of the electrolyte 2 and the lower surface (inner surface) of the top interconnector 12. It is to be noted that the current collecting members 18 on the side of the air chamber 16 may have the structure same as the current collecting members 19 on the side of the fuel chamber 17.

As described above, the fuel cell 3 forms the fuel chamber 17 and the air chamber 16 by the combination of the bottom interconnector 13, the fuel electrode insulation frame 21, the fuel electrode frame 22, the separator 23, the air electrode insulation frame 24, and the top interconnector 12, partitions to make the fuel chamber 17 and the air chamber 16 independent from each other using the electrolyte 2, and further insulates the side of the fuel electrode 15 and the side of the air electrode 14 using the fuel electrode insulation frame 21 and the air electrode insulation frame 24.

In addition, the fuel cell 3 includes an air supply unit 25 including the air supply passage 4 for supplying air to the inside of the air chamber 16, an air discharge unit 26 including the air discharge passage 5 for discharging the air to the outside from the air chamber 16, a fuel supply unit 27 including the fuel supply passage 6 for supplying a fuel gas to the inside of the fuel chamber 17, and a fuel discharge unit 28 including the fuel discharge passage 7 for discharging the fuel gas to the outside from the fuel chamber 17.

[Air Supply Unit]

The air supply unit 25 includes an air supply through-hole 29 that is opened in the vertical direction in the middle on one side of the square fuel cell 3, an air supply communication chamber 30 having a long hole shape that is opened in the air electrode insulation frame 24 so as to communicate with the air supply through-hole 29, a plurality of air supply communication units 32 each having a concave shape and formed at regular intervals on the upper surface of a partition wall 31 that partitions the air supply communication chamber 30 and the air chamber 16, and the above-described air supply passage 4 that is inserted into and communicates with the air supply through-hole 29 and is arranged to supply air to the air supply communication chamber 30 from the outside.

[Air Discharge Unit]

The air discharge unit 26 includes an air discharge through-hole 33 that is opened in the vertical direction in the middle on one side of the fuel cell 3, the one side being faced to the air supply unit 25, an air discharge communication chamber 34 having a long hole shape that is opened in the air electrode insulation frame 24 so as to communicate with the air discharge through-hole 33, a plurality of air discharge communication units 36 each having a concave shape and formed at regular intervals on the upper surface of a partition wall 35 that partitions the air discharge communication chamber 34 and the air chamber 16, and the above-described air discharge passage 5 having a tube shape that is inserted into and communicates with the air discharge through-hole 33 and is arranged to discharge air from the air discharge communication chamber 34 to the outside.

[Fuel Supply Unit]

The fuel supply unit 27 includes a fuel supply through-hole 37 that is opened in the vertical direction in the middle on one side of the square fuel cell 3, the one side being one of the two other sides, a fuel supply communication chamber 38 having a long hole shape that is opened in the fuel electrode insulation frame 21 so as to communicate with the fuel supply through-hole 37, a plurality of fuel supply communication units 40 each having a concave shape and formed at regular intervals on the upper surface of a partition wall 39 that partitions the fuel supply communication chamber 38 and the fuel chamber 17, and the above-described fuel supply passage 6 having a tube shape that is inserted into and communicates with the fuel supply through-hole 37 and is arranged to supply fuel gas to the fuel supply communication chamber 38 from the outside.

[Fuel Discharge Unit]

The fuel discharge unit 28 includes a fuel discharge through-hole 41 that is opened in the vertical direction in the middle on one side of the fuel cell 3, the one side being faced to the fuel supply unit 27, a fuel discharge communication chamber 42 having a long hole shape that is opened in the fuel electrode insulation frame 21 so as to communicate with the fuel discharge through-hole 41, a plurality of fuel discharge communication units 44 each having a concave shape and formed at regular intervals on the upper surface of a partition wall 43 that partitions the fuel discharge communication chamber 42 and the fuel chamber 17, and the fuel discharge passage 7 having a tube shape that is inserted into and communicates with the fuel discharge through-hole 41 and is arranged to discharge a fuel gas from the fuel discharge communication chamber 42 to the outside.

The fuel cell 3 is produced in the following procedure.

According to the above-described method, the current collecting members 19 in which the spacer 58 is incorporated are prepared. In these current collecting members 19, a surface, being in contact with the interconnector 13, of the connector contact portion 19*a* has a surface roughness of which ten-point average roughness is larger than that of a surface, being in contact with the spacer 58, of the current collecting member 19. A surface, being in contact with the cell body 20, of the cell body contact portion 19*b* has a surface roughness of which ten-point average roughness is larger than that of the surface, being in contact with the spacer 58, of the current collecting member 19.

The above-described current collecting members 19 on which the spacer 58 is mounted, and the fuel electrode insulation frame 21 are disposed on the interconnector 13. Then, the fuel electrode frame 22 is disposed on the fuel electrode insulation frame 21. The cell body 20 with the separator 23 is disposed such that the cell body 20 is inserted into the opening inside the frame of the fuel electrode insulation frame 21 and the fuel electrode frame 22, and such that at least a portion of the fuel electrode of the cell body is in contact with the cell body contact portions 19*b* of the current collecting members 19. That is, the current collecting members 19 are disposed between the interconnector 13 and the cell body 20, and the asperities 19*e* are in contact with the interconnector 13 and the fuel electrode of the cell body 20. The ten-point average roughness Rz of the surface roughness of the asperities 19*e* is Rz≥4 μm on the portions that are in contact with neither the cell body 20 nor the interconnector 13 measures. Measurement on the portions that are in contact with neither the cell body 20 nor the interconnector 13 means the above-described measurement on the surfaces of the connecting portions 19c, the surfaces being on the sides that are in contact with the cell body 20 or the interconnector 13.

Then, the air electrode insulation frame 24 is disposed on the cell body 20 with the separator 23, and then, the interconnector 12 is disposed on the air electrode insulation frame 24 to produce the fuel cell 3.

[Fuel Cell Stack]

The fuel cell stack 8 has a configuration such that a plurality of sets of the above-described fuel cells 3 are stacked to form a cell group, and the cell group is fixed by the fixing members 9. It is to be noted that in a case where the plurality of sets of the fuel cells 3 are stacked, the top interconnector 12 of the fuel cell 3 that is located lower, and the bottom interconnector 13 of the fuel cell 3 that is placed on the lower fuel cell 3 are integrated into one interconnector, and the upper and lower fuel cells 3 share the one interconnector.

The above-described fixing members 9 are combinations of a pair of end plates 45a and 45b for sandwiching the cell group vertically, and four pairs of the clamping members 46a to 46d for clamping the end plates 45a and 45b to the cell group by inserting bolts into corner holes (not illustrated) of the end plates 45a and 45b and the above-described corner through-holes 47, 47 to fasten them with nuts. Examples of the material of the clamping members 46a to 46d include Inconel 601.

Figure 7:
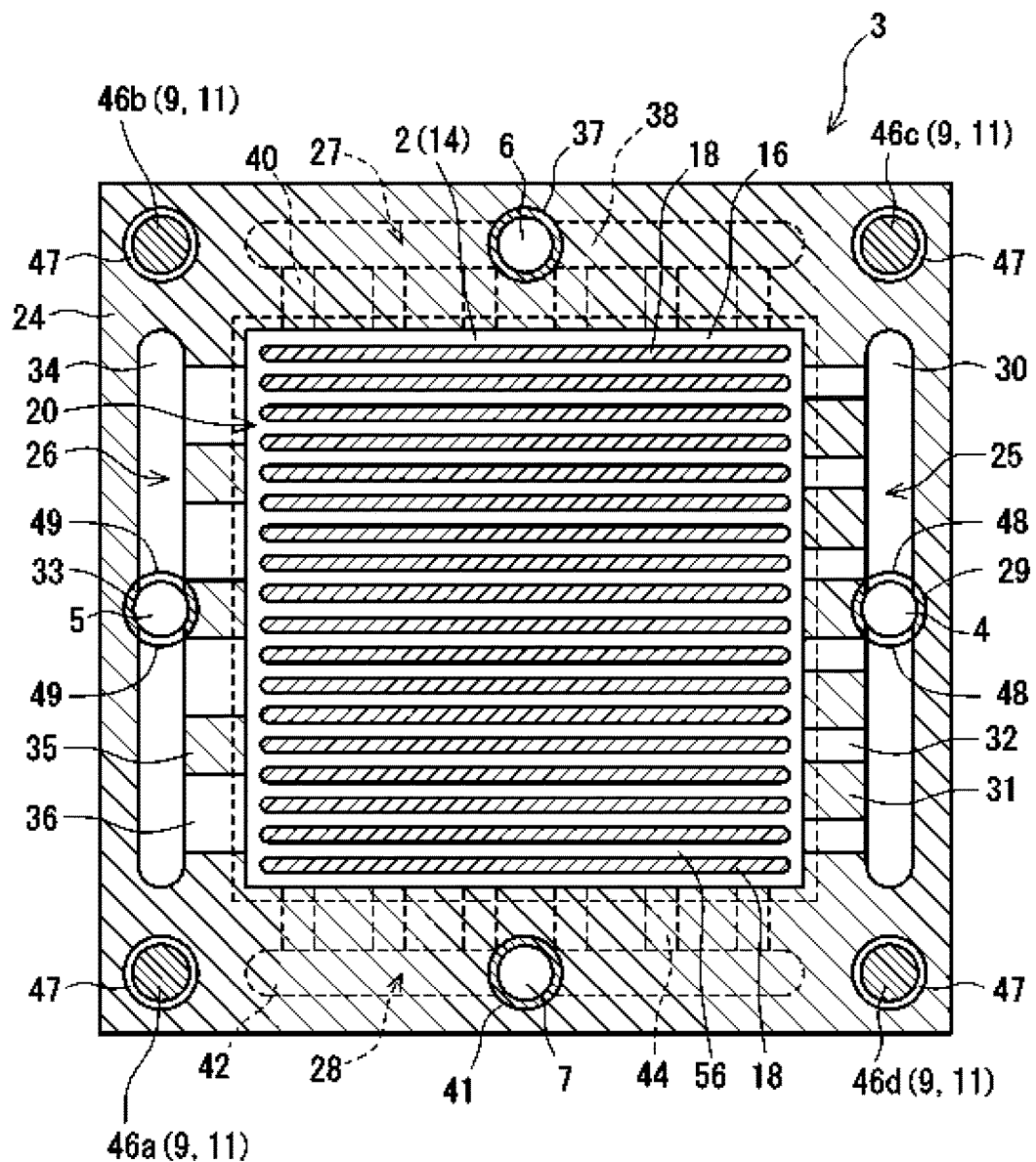
FIG. 7 is a sectional view taken along the line A-A of FIG. 5.

The above-described air supply passage 4 is mounted so as to penetrate through-holes (not illustrated) of the end-plates 45a and 45b and the air supply through-holes 29 of the cell group in the vertical direction with respect to the fuel cell stack 8, and the end portion of the tubular passage is closed while lateral holes 48 are provided as shown in FIG. 7 so as to each correspond to the air supply communication chambers 30, whereby air is supplied to the air supply communication chambers 30 via the lateral holes 48.

Figure 8:
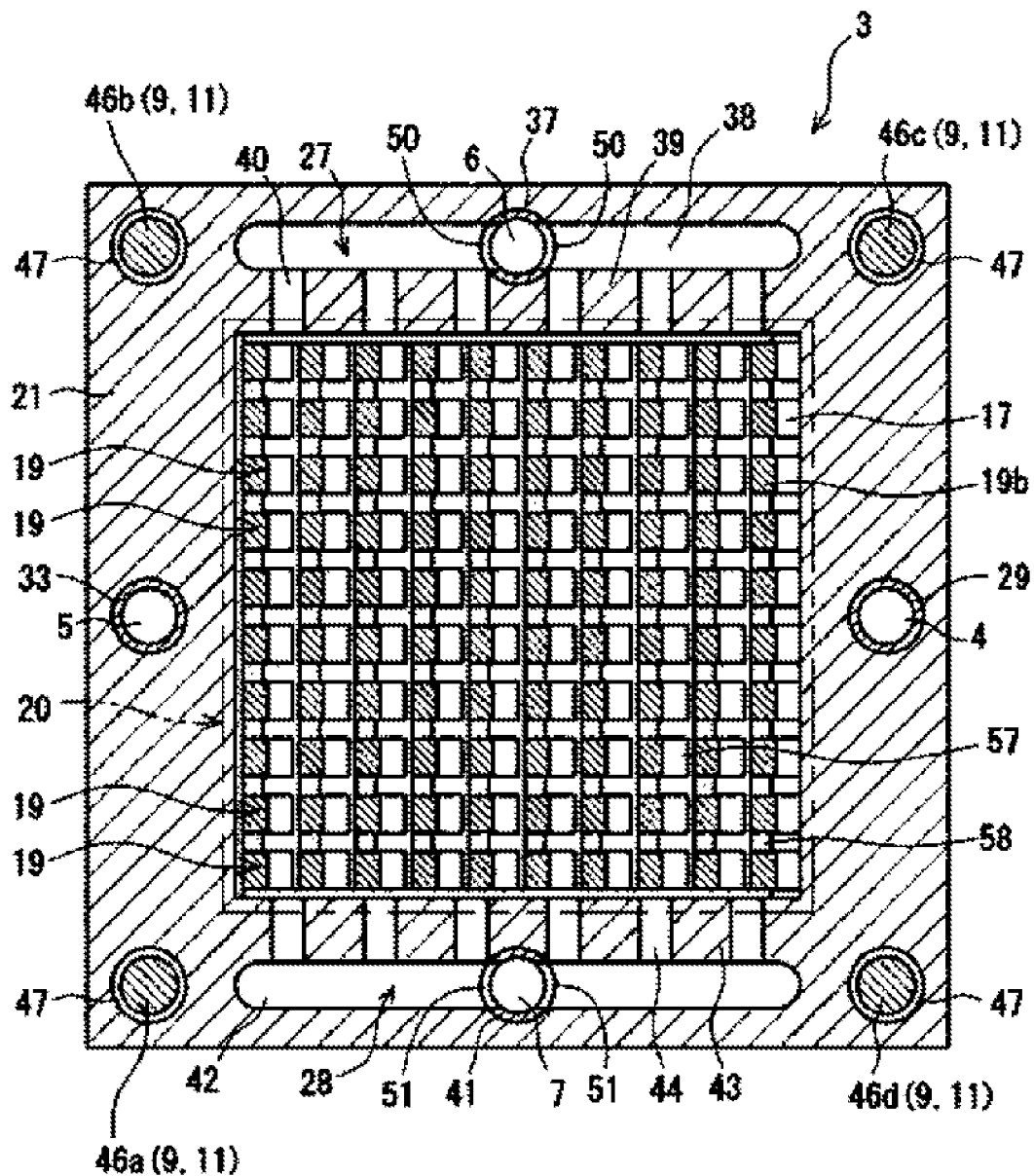
FIG. 8 is a sectional view taken along the line B-B of FIG. 5.

In a similar manner, the air discharge passage 5 takes in the air from lateral holes 49 each corresponding to the air discharge communication chambers 34 to discharge the air to the outside, the fuel supply passage 6 supplies a fuel gas from lateral holes 50 each corresponding to the fuel supply communication chambers 38 as shown in FIG. 8, and the fuel discharge passage 7 takes in the fuel gas from lateral holes 51 each corresponding to the fuel discharge communication chambers 42 to discharge the fuel gas to the outside.

[Container]

The container 10 for housing the fuel cell stack 8 has heat resistance and sealed structure, and includes two half bodies 53a and 53b that include flanges 52a and 52b on their opening portions and are joined together so as to face each other as shown in FIG. 1. The bolts of the above-described clamping members 46a to 46d project from the top of this container 10 to the outside, and the nuts 54 are screwed onto the projecting portions of these clamping members 46a to 46d to fix the fuel cell stack 8 inside the container 10. In addition, the air supply passage 4, the air discharge passage 5, the fuel supply passage 6, and the fuel discharge passage 7 also project to the outside from the top of the container 10, and sources for supplying air and a fuel gas and the like are connected to the above-described projecting portions.

[Output Members]

The output members 11 for outputting electricity generated by the fuel cell stack 8 define the clamping members 46a to 46d on the corner portions of the fuel cell stack 8, and the end plates 45a and 45b, electrically connect the pair of clamping members 46a and 46c that diagonally face each other with the top end plate 45a that is a positive electrode, and electrically connect the other pair of clamping members 46b and 46d with the bottom end plate 45b that is a negative electrode. As a matter of course, the clamping members 46a and 46c connected with the positive electrode and the clamping members 46b and 46d connected with the negative electrode are insulated from the end plate 45a (45b) of the other electrodes by making metallic washers 55 intervene (FIG. 1), and are insulated from the fuel cell stack 8 by providing clearance between the clamping members 46a to 46d and the corner through-holes 47. Thus, the clamping members 46a and 46c of the fixing members 9 function also as output terminals of the positive electrode that are connected to the top end plate 45a, and the other clamping members 46b and 46d function also as output terminals of the negative electrode that are connected to the bottom end plate 45b.

[Power Generation]

When air is supplied to the air supply passage 4 of the above-described fuel cell stack structure 1, the air flows in a direction from right to left of FIG. 7, is supplied to the air chambers 16 through the air supply units 25 including the air supply passage 4, the air supply communication chambers 30, and the air supply communication units 32 that are on the right side, passes through gas passages 56 among the current collecting members 18 of the air chambers 16, and is further discharged to the outside through the air discharge units 26 including the air discharge communication units 36, the air discharge communication chambers 34, and the air discharge passage 5.

At the same time, When hydrogen as an example of a fuel gas is supplied to the fuel supply passage 6 of the fuel cell stack structure 1, the fuel gas flows in a direction from the top to the bottom of FIG. 8, and is supplied to the fuel chambers 17 through the fuel supply units 27 including the fuel supply passage 6 located on the top side, the fuel supply communication chambers 38, and the fuel supply communication units 40. The fuel gas further passes with being diffused through gas passages 57 (see the non-shaded area in the fuel chamber 17 in FIG. 8), which are formed between the current collecting members 19, 19 . . . , more strictly to say, formed between the cell body contact portions 19b, 19b . . . , to be discharged to the outside through the fuel discharge units 28 including the fuel discharge communication units 44, the fuel discharge communication chambers 42, and the fuel discharge passage 7.

It is to be noted that if the current collecting members 19 are made of a porous metal, a wire net, or a wire as described above, the surfaces of the gas passages 57 become uneven to improve the diffuseness of the fuel gas.

Raising the temperature inside of the above-described container 10 to 700° C. to 1000° C. by supplying/discharging air and a fuel gas in this manner causes the air and the fuel gas to initiate a reaction via the air electrodes 14, the electrolytes 2, and the fuel electrodes 15, so that direct-current electrical energy is generated with the air electrodes 14 functioning as positive electrodes while the fuel electrodes 15 functioning as negative electrodes. It is to be noted that the principle of how electrical energy is generated in the fuel cell 3 is known, the explanation of which is omitted.

The air electrodes 14 are electrically connected to the top interconnectors 12 through the current collecting members 18 while the fuel electrodes 15 are electrically connected to the bottom interconnectors 13 through the current collecting members 19 as described above, and the fuel cell stack 8 is in a state where the plurality of the fuel cells 3 are stacked to be connected in series to each other, so that the top end plate 45a becomes a positive electrode while the bottom end plate 45b becomes a negative electrode, and the electrical energy can be taken out to the outside via the clamping members 46a to 46d that function also as output terminals.

As described above, a fuel cell repeats temperature cycles such that the temperature rises during power generation and falls when power generation stops. Hence, also all the constituent members of the fuel chambers 17 and the air chambers 16, and the above-described clamping members 46a to 46d are thermally expanded and shrunk repeatedly, and accordingly the spaces of the fuel chambers 17 and the air chambers 16 are expanded and shrunk repeatedly.

In addition, also the fuel pressure or the air pressure sometimes fluctuates, so that the spaces of the fuel chambers 17 or the air chambers 16 are expanded or shrunk also by deformation of the cell bodies 20 due to the fluctuations of the pressure.

In accordance with the change in the expansion direction of the fuel chambers 17 and the air chambers 16, the current collecting members 19 on the side of the fuel chambers 17 press the cell bodies 20 mainly by the thermal expansion in the same direction as the elasticity in the stacking direction of the spacers 58 (the thickness direction or the clamping direction of the clamping members 46a to 46d) in the present embodiment, so that electrical connection can be maintained stably. In particular, since the current collecting members 19 according to the present embodiment have fine asperities on the outside surfaces, the pressure converges to the convex portions of the fine asperities to raise contact pressure in a micro view, so that electrical connection can be maintained more stably.

It is to be noted that the pressure of the cell bodies 20 by the current collecting members 19 has an effect also on the side of the air chambers 16, so that electrical connection of the air chambers 16 can be maintained stably, too.

In addition, in accordance with the change in the shrinkage direction of the fuel chambers 17 and the air chambers 16, the stress applied onto the cell bodies 20 is reduced mainly by the shrinkage of the spacers 58 on the side of the fuel chambers 17.

In addition, if the current collecting members 19 on the side of the fuel electrodes 15 are made from Ni or an Ni alloy, the cell body contact portions 19b are diffused and joined to be integrated with Ni in the fuel electrodes 15 in the high temperature environment during power generation.

Thus, electrical connection by the current collecting members 19 can be maintained stably.

It is preferable to coat the fuel electrodes 15 with an NiO paste to form joining layers.

The NiO thus becomes Ni when applying current in H2, so that joining characteristics of the current collecting members 19 and the fuel electrodes 15 are further improved.

The above-described joining layers may be formed by coating the fuel electrodes 15 with a Pt paste.

Meanwhile, the current collecting members 19 on the side of the fuel electrodes 15 according to the present embodiment are made from Ni or an Ni alloy as described above, and the interconnectors 13 in contact with the current collecting members 19 are made from ferritic stainless steel (e.g., Crofer22H), so that these are a combination to be diffused to be joined together in the high temperature environment. Hence, the connector contact portions 19a are diffused and joined to be integrated with the interconnectors 13 in the high temperature environment during power generation. At this time, joint strength of the diffusion join is increased by the asperities 19e on the outside surfaces of the current collecting members 19, so that peeling or resistance increase seldom occurs even without deliberately using a conductive paste.

The foregoing description of the embodiment of the present invention has been presented; however, it is not intended to be exhaustive or to limit the present invention to the above-described embodiment. For example, while the fine asperities 19e are formed on the outside surfaces by using Ni foil (metallic foil) made in the electroplating method as the current collecting members 19 in the present embodiment, the above-described asperities 19e may be formed by subjecting a metallic material to known sand-blasting or etching.

REFERENCE SIGNS LIST

1 . . . Fuel cell stack structure
2 . . . Electrolyte
3 . . . Fuel cell
8 . . . Fuel cell stack
12, 13 . . . Interconnectors
14 . . . Air electrode
15 . . . Fuel electrode
18, 19 . . . Current collecting members
19a . . . Connector contact portion
19b . . . Cell body contact portion
19c . . . Connecting portion
19d . . . Cutoff line
19e . . . Asperities
19f . . . Segment
20 . . . Cell body
46a to 46d . . . Clamping members
58 . . . Spacer
61 . . . Front surface
62 . . . Back surface
190 . . . Metallic flat plate

The invention claimed is:
1. A fuel cell comprising:
a pair of interconnectors;
a cell body, which is disposed between the interconnectors, and which includes an air electrode on one surface of an electrolyte and a fuel electrode on the other surface; and
a current collecting member, which is disposed between at least one of the air electrode and the fuel electrode, and the interconnectors, and which is arranged to electrically connect the air electrode and/or the fuel electrode with the interconnectors,
wherein the current collecting member comprises a connector contact portion that is in contact with the interconnector, a cell body contact portion that is in contact with the cell body, and a connecting portion that is bent approximately 180 degrees and connects the connector contact portion and the cell body contact portion, the connector contact portion, the cell body contact portion and the connecting portion being formed in line, and the connector contact portion comprising asperities having surface roughness of which ten-point average roughness is Rz≥4 μm on an outside surface that is a surface of the connector contact portion on the side where the connector contact portion is in contact with the interconnector, and
wherein the fuel cell comprises a spacer disposed between the connector contact portion and the cell body contact portion that are opposed to each other between the cell body and the interconnector.

2. The fuel cell as claimed in claim 1, wherein the current collecting member is made of metallic foil made in an electroplating method.

3. The fuel cell as claimed in claim 1, wherein the current collecting member has a thickness of 15 to 100 μm.

4. The fuel cell as claimed in claim 1, wherein the outside surface of the current collecting member is made of metallic foil subjected to any one of sandblasting and etching.

5. The fuel cell as claimed in claim 1, wherein the connector contact portion of the current collecting member is diffused to be joined to the interconnectors.

6. A fuel cell stack comprising:
a plurality of the fuel cells as claimed in claim 1,
wherein the fuel cells are stacked and are fixed by a clamping member.

7. A method for producing the fuel cell as claimed in claim 1,
the method comprising the steps of:
disposing the cell body between the pair of interconnectors;
preparing the current collecting member made of the metallic flat plate having the back surface that has surface roughness of which ten-point average roughness is larger than the front surface; and
disposing the current collecting member between the interconnectors and at least one of the air electrode and the fuel electrode of the cell body,
wherein in the step of disposing the current collecting member, the back surface of the current collecting member is disposed so as to be electrically connected with the interconnectors and the electrodes of the cell body opposed to the interconnectors.

8. The method for producing the fuel cell as claimed in claim 7, the method comprising the steps of:
making a cutoff line to form a segment in the metallic flat plate, and bending to raise the segment from the metallic flat plate; and
disposing a spacer on the metallic flat plate, and sandwiching the spacer between the segment and the metallic flat plate to form the current collecting member.

9. The method for producing the fuel cell as claimed in claim 7, the method comprising a step of:
making a cutoff line to form a segment in the metallic flat plate, and bending a portion of the segment into a U-shape so that the segment covers the metallic flat plate to form the current collecting member.

10. The method for producing the fuel cell as claimed in claim 9, the method comprising a step of:
disposing a spacer between the segment and the metallic flat plate after the step of forming the current collecting member.

11. The method for producing the fuel cell as claimed in claim 7, wherein the back surface of the metallic flat plate has surface roughness of
which ten-point average roughness Rz is Rz≥4 μm.

* * * * *